United States Patent [19]

Einsle et al.

[11] Patent Number: 4,726,750

[45] Date of Patent: Feb. 23, 1988

[54] DEVICE FOR DOUBLE ENCASING A STRAND OF MATERIAL CONTAINING ONE OR MORE WAVEGUIDES

[75] Inventors: Guenter Einsle, Munich; Ernst Mayr, Starnberg; Gernot Schoeber; Wolfgang Schrey, both of Munich, all of Fed. Rep. of Germany

[73] Assignee: Siemens Aktiengesellschaft, Berlin and Munich, Fed. Rep. of Germany

[21] Appl. No.: 828,725

[22] Filed: Feb. 12, 1986

[30] Foreign Application Priority Data

Feb. 26, 1985 [DE] Fed. Rep. of Germany ....... 3506673

[51] Int. Cl.$^4$ .................... B29C 47/02; B29C 47/88
[52] U.S. Cl. ........................................ 425/71; 264/1.5; 264/348; 425/114; 425/378 R
[58] Field of Search ............ 425/71, 113, 114, 378 R, 425/67, 70, 143; 264/1.5, 1.6, 1.7, 172, 174, 176 F, 348, 237, 177.19, 176.1; 350/96.23, 96.24, 96.3, 96.33

[56] References Cited

U.S. PATENT DOCUMENTS

| | | | |
|---|---|---|---|
| 3,446,883 | 5/1969 | Garner | 264/174 |
| 3,694,538 | 9/1972 | Okamoto et al. | 425/114 X |
| 3,728,424 | 4/1973 | Bauer | 264/348 X |
| 3,729,539 | 4/1973 | Hill | 264/348 X |
| 3,742,105 | 6/1973 | Kuroda | 264/348 X |
| 3,846,528 | 11/1974 | Chrisman et al. | 264/174 X |
| 3,952,407 | 4/1976 | Aupoix et al. | 425/114 X |
| 4,112,031 | 9/1978 | Gohlisch | 425/114 X |
| 4,150,082 | 4/1979 | Brick et al. | 264/348 X |
| 4,197,381 | 4/1980 | Alia | 264/174 X |
| 4,414,165 | 11/1983 | Oestreich et al. | 264/174 X |
| 4,458,476 | 7/1984 | Mayr et al. | 264/1.5 X |
| 4,474,638 | 10/1984 | Einsle | 425/114 X |

Primary Examiner—Richard L. Chiesa
Attorney, Agent, or Firm—Hill, Van Santen, Steadman & Simpson

[57] ABSTRACT

A device for encasing a rope-like strand containing one or more light waveguides, which device includes two extruders situated one after the other characterized by a fluid cooling device positioned between the two extruders for applying a cooling fluid to the external surface of a first layer applied by the first extruder to cool it prior to extruding a second layer thereon. The cooling device enables increasing the rate of travel of the rope-like strand during the extruding operation.

13 Claims, 3 Drawing Figures

DEVICE FOR DOUBLE ENCASING A STRAND OF MATERIAL CONTAINING ONE OR MORE WAVEGUIDES

BACKGROUND OF THE INVENTION

The present invention is directed to a device for double encasing a rope-like material containing one or more light waveguides which have been stranded together. The device utilizes two extruders which are spaced to extrude a first layer onto the rope-like material and then subsequently extrude a second layer onto the first layer.

It is known that two sheathing layers can be successively applied by extruders when cladding rope-like material containing one or more light waveguides. An example is disclosed in U.S. Pat. No. 4,414,165 which was based on the German application No. 31 11 963. As disclosed in this U.S. Pat. No. 4,414,165, whose disclosure is incorporated by reference thereto, a filling compound which provides a cooling effect and thereby shortens the stretching cone for the extrusion nozzles is applied before the application of the inside or inner sheath or cladding. In many cases however, it is desirable to increase the working speed, for example, the rate of passage of the bundle of optical fibers to such a degree that an adequate solidification can no longer be achieved by using such cooling measures in the brief time available unless unnecessarily great distances are provided between the first and second extruder. However, increasing the distance between the first and second extruder has proven extremely unfavorable because of the great space requirement among other things and moreover due to the over-stressing of the mechanical stability of the yet-unhardened cladding layers or sheaths.

SUMMARY OF THE INVENTION

The object of the present invention is to improve an apparatus for extruding an inner and an outer sheath or cladding onto a rope-like strand containing one or more light waveguides so that the work can be carried out with a higher output rate and which apparatus assures that the inner sheath has already sufficiently solidified when the second sheath is extruded thereon. In accordance with the invention, this object is achieved by an improvement in a device for double encasing a rope-like strand containing one or more light waveguides, said device having two extruders spaced along the path of movement for the rope-like strand. The improvements are that a cooling means for externally applying a cooling fluid to an outer surface of a first layer of cladding or sheath material is positioned between the first and second extruders.

Because the fluid cooling occurs from the outside, adequately high quantities of the coolant, which are also correspondingly selected in terms of their temperature, can be supplied to the still-soft sheath and a rapid solidification will therefore occur. In known apparatus by contrast, the cooling depends only on the condition and the temperature of the filling compound and to a certain degree on the externally acting cooling air. Both, however, cannot be kept arbitrarily cooled without further ado because, for example, the filling compounds below certain temperatures become too viscous and thus become hard to process and the coefficient of heat transmission for the cooling air is extremely low. In addition, the light waveguides or, respectively, the group of light waveguides is not surrounded with an arbitrarily coolable filling compound in all cases. Above all else, the present invention is also employable for horizontally functioning light waveguide bundles or, respectively, light waveguide strands.

The improved device also achieves a greater cooling in that the distance between extruders can be selected to be relatively large because the solidification of the applied first sheath can be very quickly executed and thus the second extruder can be positioned at a greater distance from the first. Space is thus created for the cooling device and for the following drying device or means. The surface of the first sheath must be absolutely coolant-free or dry before the second coating can be applied.

Instead of utilizing ordinary water, other more quickly evaporating agents can be utilized for cooling, for example, alcohol, whose vapors, of course, must be suctioned off. Thus, the cooling material can be selected from a group of materials consisting of water, alcohol and mixtures of water and alcohol.

In further developments of the invention, the cooling means includes at least one annular nozzle having an inner diameter through which the rope-like strand of material with the first or inner sheath passes. The nozzle has a cylindrical shape and is provided with a plurality of radially inwardly extending apertures through which the cooling medium or fluid will flow to entirely cover the outer surface of the inner sheath or layer. Subsequent to passing through the cooling means, the cooled sheath will pass through an extraction means or device for removing any of the fluid therefrom prior to reaching the second extruding device.

As mentioned hereinabove, the improvements of the present invention enable placing the extruders to operate on a horizontally traveling strand or cable. The distance between the two extruders of the device is preferably more than 0.5 meters and is preferably in a range of 0.5 meters to 2 meters.

DESCRIPTION OF THE PREFERRED EMBODIMENTS

Figure 1:
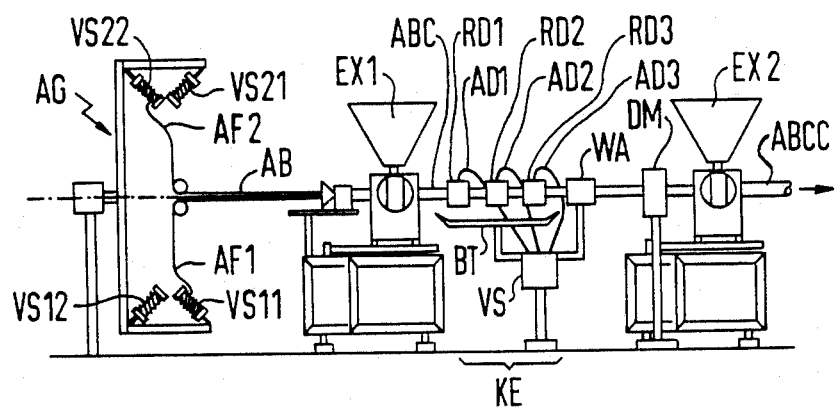
FIG. 1 is a side view of the device of the present invention.
Figure 2:
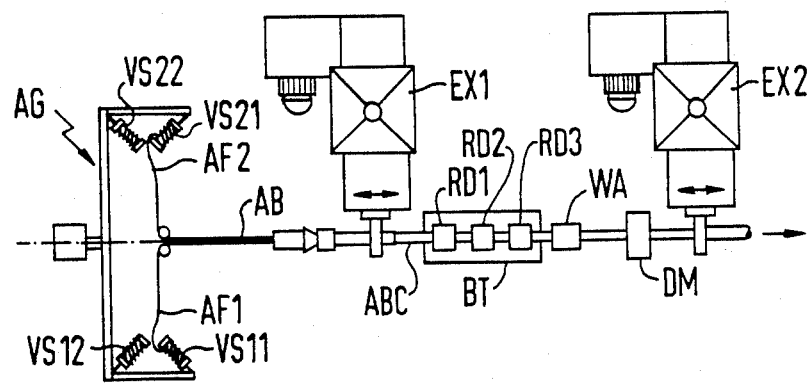
FIG. 2 is a plan view of the device of the present invention.

The principles of the present invention are particularly useful in a device illustrated in FIGS. 1 and 2 which extrudes an inner or first sheath or cladding layer on a cable or strand of one or more waveguides and subsequently extrudes a second or outer cladding layer or sheath on the first sheath. The device as illustrated in FIGS. 1 and 2 includes a pay-out stand AG, which is equipped with supply reels VS11, VS12, VS21 and VS22 (only four are shown for purposes of illustration). As illustrated, light waveguide leads such as optical fibers AF1 and AF2 are removed from the reels VS11 and VS22 and are combined into a bundle or strand AB of waveguides. Instead of such a bundle of waveguides, however, a single light waveguide can also be treated in the device of the present invention.

The bundle AB of waveguides, which can be stranded together in a rope-like manner or can consist of a single waveguide, is pre-moistened with a filling compound under certain conditions and then proceeds to a first extruder EX1 which will extrude a first sheath or cladding layer of plastic material on the bundle AB. The bundle with the first layer leaving the extruder EX1 is referenced ABC. After having the first coating or sheath applied by the extruder EX1, the bundle ABC will then have a second coating or sheath applied by a second extruder EX2 to form a bundle having two sheaths which is indicated at ABCC. In order to apply the second sheath or cladding, the first applied sheath must have become sufficiently solidified. To this end, a cooling device KE is interposed between the output of the first extruder EX1 and the input to the extruder EX2. The cooling apparatus KE is constructed so that it externally withdraws as much heat as possible from the extruded sheath or cladding applied by the extruder EX1 over a very short length of travel of the coated bundle or strand ABC.

The cooling apparatus KE includes a plurality of annular nozzles RD1, RD2 and RD3, which are positioned one after another so that the bundle ABC with the single extruded casing passes in succession through each of these nozzles before reaching the second extruder. A fluid medium, preferably water, is employed as the coolant and this is supplied to each of the annular nozzles RD1-RD3 by appropriate connecting lines AD1-AD3. The cooling fluid flowing off of the bundle ABC from each of the nozzles is collected in a vessel or pan BT and returned to a reservoir VS. Appropriate pumps, which are not shown in detail, are provided in the exit ports for the reservoir VS and these pumps are respectively allocated one to each of the connecting lines AD1-AD3. If necessary, the circulation arrangement, which is a closed system that includes the lines AD1-AD3, the pan BT and reservoir VS, can have an additional cooling device. This additional cooling device enables artifically holding the cooling medium at a lower temperature. As a result of the cooling of the bundle ABC having the single cladding, the first sheath applied by the extruder EX is so greatly cooled within a short path that the distance between the extruder EX1 and EX2 can be arbitrarily selected and a high output speed or rate at the extruders is obtainable.

In order to guarantee disruption-free extrusion of the second sheathing layer to be applied on the first sheathing layer of the bundle ABC by the extruder EX2, an extraction device or means WA which removes droplike residue of the fluid is expediently present and positioned between the last nozzle RD and the entrance to the second extruder EX2. It should be noted that a complete drying is not absolutely necessary because the sheathing applied by the extruder EX1 is still warm enough in the region of the extraction device WA that the remaining moisture will dry very quickly. A thickness measuring device DM can also be provided to precede the extruder EX2. More rapid evaporating agents such as alcohol which can be either methyl, ethyl, propanol, glycol, etc. can be employed for an especially intense intermediate cooling. In addition, mixtures of water and alcohol are also possible. The rope-like material ABCC obtained at the output of the extruder EX2 will be double encased and is further processed in a known way after being discharged from this extruder. This further processing will include winding or depositing the doubly encased rope-like strand ABCC on suitable drums or reels or coiling the strand on suitable dishes or supports.

Figure 3:
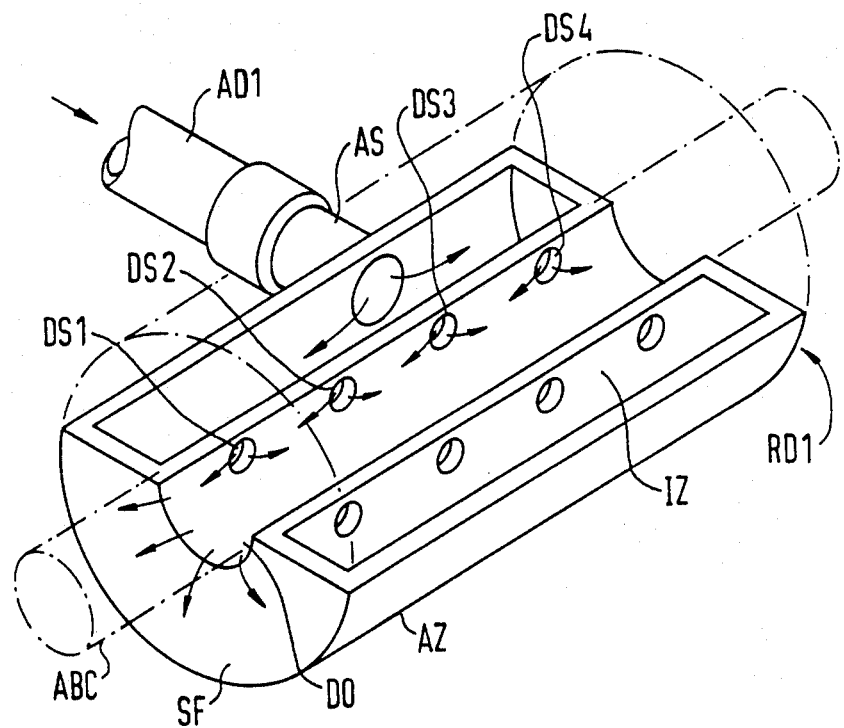
FIG. 3 is an enlarged perspective view of an annular nozzle utilized in a device of the present invention.

Each of the annular nozzles RD1 through RD3 is advantageously composed of two half shells of which one, namely, the lower half shell is shown in greater detail in FIG. 3. The lower half shell is composed of an outer half cylinder AZ and a concentrically disposed inner half cylinder IZ with end walls such as SF to form an annular hollow member. When two half shells are put together, the construction of the end walls and the inner cylinder IZ are such as to provide a cylindrical transit opening DO, which is of a size so that the incoming, singly encased strand ABC shown in dot-dash lines can be conducted through the nozzle without brushing against the inside walls of the transit opening DO. Every annular nozzle comprises a connecting sleeve AS to which the associated connecting line such as AD1 is connected. The supplied coolant first flows into the cylindrical annular zone between the outside jacket AZ and inside cylindrical jacket IZ and then proceeds through a plurality of nozzle apertures or orifices DS1-DS4 into the transit opening DO. The fluid will thus create a flow that will cover all outer surfaces of the encased strand ABC passing therethrough and this fluid will then emerge from the nozzle RD1 at one of the end faces such as the end face SF as indicated by the arrows. In this way, the singly encased strand ABC is protected against any mechanical contact with the annular nozzle RD1 and is simultaneously carried by the coolant. This has the advantage that the singly encased strand ABC is not mechanically stressed because practically no friction occurs during its passage through the opening DO. The cooling effect is also improved so that an adequate lowering of the temperature of the sheath applied by the extruder EX1 can be obtained in a relatively short space and with a high rate of speed for movement of the encased cable or strand ABC.

This type of managing for the singly encased or sheath rope-like strand or cable in a coolant flowing past in an axial direction in the region of the annular nozzle also offers the possibility of constructing an extruding arrangement where the cable is moving in a horizontal direction even when the leads such as AF1 and AF2 are not all too stiff. It is also not necessary that the sheath, which is being applied by the extruder EX1, be particularly thick or stiff. Because the sheath or cladding applied by the extruder EX1 is already quickly and adequately solidified by the cooling device KE immediately following the discharge from the extruder EX1, an unavoidable great sag is avoided. Moreover, the frictional forces are avoided as a consequence of the strand floating on the coolant.

It is possible to realize a speed in the device in the range of 10 to 200 meters per minute and to thereby select the distance between the extruders EX1 and EX2 to be up to a number of meters. Preferably, the distance is more than one-half meter and preferably falls in a range of 0.5 to 2 meters.

Although various minor modifications may be suggested by those versed in the art, it should be understood that we wish to embody within the scope of the patent granted hereon, all such modifications as reasonably and properly come within the scope of our contribution to the art.

We claim:

1. In a device for double encasing a rope-like strand containing one or more light waveguides, said device utilizing first and second extruders situated one after the other to apply successive first and second layers of sheath material onto the strand, the improvements comprising cooling means being positioned between the first and second extruders to externally apply a cooling liquid on the outer surface of the first layer to cool the first layer and extraction means being positioned betweeen the cooling means and second extruder to remove residue of the cooling liquid from the first layer before the second layer is applied.

2. In a device according to claim 1, wherein the cooling means utilizes a cooling liquid selected from a group consisting of water, alcohol and mixtures of water and alcohol.

3. In a device according to claim 1, wherein the cooling means includes at least one annular nozzle having a transit opening with a diameter greater than the outside diameter of the rope-like strand with the first layer and said rope-like strand with said first layer being conducted through the opening.

4. In a device according to claim 3, wherein the first and second extruders, the cooling means and the extraction means are arranged to process the rope-like strand moving in a horizontal direction.

5. In a device according to claim 4, wherein the distance between the first and second extruders is selected to be in a range of between 0.5 m and 2 m.

6. In a device according to claim 3, wherein the annular nozzle includes an outside cylindrical member with a concentrically disposed inside cylindrical member, said cylindrical members being interconnected by end walls to form an annular hollow member, said inside cylindrical member forming the transit opening and having a plurality of nozzle apertures for emitting a cooling liquid from the annular hollow portion into the transit opening and into contact with the outer surface of the first layer.

7. In a device according to claim 6, wherein the extruders, cooling means and extraction means are arranged so that the strand is moving in a horizontal direction.

8. In a device according to claim 7, wherein the distance between the first and second extruder is selected to be greater than 0.5 m.

9. In a device according to claim 7, wherein the distance between the first and second extruder is selected to be in a range of between 0.5 m and 2 m.

10. In a device according to claim 7, wherein the cooling fluid is a liquid selected from a group consisting of water, alcohol and mixtures of water and alcohol.

11. In a device according to claim 1, wherein the distance between the first and second extruders is selected to be in a range of between 0.5 m and 2 m.

12. In a device according to claim 1, wherein the first and second extruders, the cooling means and the extraction means are arranged to process the rope-like strand moving in a horizontal direction.

13. In a device according to claim 12, wherein the distance between the first and second extruders is selected to be in a range of between 0.5 m and 2 m.

* * * * *